US005664789A

United States Patent [19]

Hayashi

[11] Patent Number: 5,664,789

[45] Date of Patent: Sep. 9, 1997

[54] SEAL CONSTRUCTION FOR USE IN VALVE ASSEMBLY

[75] Inventor: Bunya Hayashi, Yawara-mura, Japan

[73] Assignee: SMC Corporation, Tokyo, Japan

[21] Appl. No.: 520,269

[22] Filed: Aug. 28, 1995

[30] Foreign Application Priority Data

Sep. 21, 1994 [JP] Japan .................................... 6-252870

[51] Int. Cl.$^6$ ........................................ F16J 15/10

[52] U.S. Cl. ....................... 277/180; 277/207 R; 277/211

[58] Field of Search ............................... 277/165, 207 R, 277/211, 180

[56] References Cited

U.S. PATENT DOCUMENTS

| | | | |
|---|---|---|---|
| 2,058,010 | 10/1936 | Fitch | 277/211 |
| 2,661,229 | 12/1953 | Slaughter, Jr. | 277/211 |
| 3,837,657 | 9/1974 | Farnam et al. | 277/211 |
| 4,230,143 | 10/1980 | Dettmann et al. | 137/270 |
| 4,597,583 | 7/1986 | Inciong et al. | 277/211 |
| 4,605,202 | 8/1986 | Tsuno et al. | 277/167.5 |
| 5,080,058 | 1/1992 | Ferrazzi | 277/207 R |
| 5,086,803 | 2/1992 | Nakajima | 137/270 |
| 5,221,097 | 6/1993 | Ishikawa et al. | 277/207 R |
| 5,320,497 | 6/1994 | Nagai et al. | 417/186 |

FOREIGN PATENT DOCUMENTS

| | | |
|---|---|---|
| 0 002187 | 6/1979 | European Pat. Off. . |
| 42 09337 | 1/1993 | Germany . |

*Primary Examiner*—Thomas B. Will
*Assistant Examiner*—John L. Beres
*Attorney, Agent, or Firm*—Oblon, Spivak, McClelland, Maier & Neustadt, P.C.

[57] ABSTRACT

A gasket 4 to be interposed between a valve mounting face 2*a* of a manifold base 2 and a joining face 3*a* on a casing of a change-over valve 3 is provided with ridges 35 at least on one side thereof. On the other hand, grooves 12 or 20 are substantially complementarily formed on the valve mounting face 2*a* of the base 2 or on the joining face 3*a* of the valve casing, so that the gasket 4 is securely clamped between the valve mounting face 2*a* and the joining face 3*a* not only at the ridges 35 but also at flat seal surfaces 4*a* on the opposite sides of the ridges 35.

2 Claims, 3 Drawing Sheets

SEAL CONSTRUCTION FOR USE IN VALVE ASSEMBLY

BACKGROUND OF THE INVENTION

1. Field of the Art

This invention relates to a seal construction suitable for use in a valve assembly, and more particularly to a seal construction suitable for use in hermetically joining a manifold base, which contains a plural number of fluid inlet and outlet passages, with a casing of a change-over valve which is operated to switch fluid flows through the fluid inlet and outlet passages in the manifold base.

2. Prior Art

For example, it has been well known in the art to assemble a change-over valve mechanism on a manifold base which contains a plural number of fluid inlet and outlet passages, for the purpose of supplying and discharging pressurized air or other pressurized fluid medium indirectly through the manifold base instead of directly feeding the pressurized air to and from inlet and outlet ports on the change-over valve mechanism through separate pipes. In a valve assembly of this sort, a gasket is usually provided between the manifold base and the change-over valve as a seal to prevent leaks of the pressurized air.

The conventional gaskets which serve for the above-mentioned purpose are generally of a flat sheet-like form with planar surfaces, and designed to be gripped and clamped between flat joining surfaces of a manifold base and a change-over valve casing. Therefore, if a stronger force is imposed on a certain locality of the gasket while being set into a clamped position, it is very likely for the gasket to undergo deformation or positional deviation, making it difficult to set it correctly in a predetermined seal position and often resulting in sealing failures. Similarly, conventional gaskets are apt to undergo deformations or deviations when a high air pressure is applied thereto from a lateral direction, increasing the possibilities of leaks of the pressurized fluid.

The problems of positional deviations and deformations of a gasket can be prevented by fitting same in shallow grooves which are formed on the joining surfaces of the manifold base and the change-over valve casing. However, generally gaskets are very thin in thickness, so that, without sophisticated high-tech facilities, it is extremely difficult to form shallow grooves which are capable of compressing a thin gasket to such a degree as to guarantee a tight seal while holding it securely in a predetermined seal position against deviations and deformations. In addition, as long as a flat gasket is clamped between flat joining surfaces, it makes no significant difference from a gasket which is clamped between joining surfaces without grooves, giving rise to the same difficulties in securing a high sealing strength.

SUMMARY OF TEE INVENTION

It is a primary object of the present invention to provide a seal construction suitable for use in a change-over valve assembly, which is capable of forming a secure seal between a manifold base and a change-over valve casing by the use of a gasket in such a manner as to preclude positional deviations and deformations of the gasket.

It is another object of the present invention to provide a seal construction of the sort mentioned above, which is enhanced in seal strength as compared with a seal using an ordinary flat gasket between flat joining surfaces.

In accordance with the present invention, the above-stated objectives are achieved by a seal construction particularly suitable for use in a change-over valve assembly including a manifold base containing a plural number of fluid supply and discharge passages and joined with a change-over valve casing through a flat gasket interposed between joining faces of the manifold base and the valve casing each containing connecting ports in communication with the fluid supply and discharge passages in the manifold base, characterized in that the seal construction includes: endlessly connected ridges formed at least on one side of the gasket in such a manner as to circumvent the connecting ports on an opposing joining surface of the manifold base or the change-over valve casing and to extend substantially centrally of flat sealing surfaces of the gasket; and grooves formed on the opposing joining face in a profile substantially complementary to the ridges to receive and grip the latter when the manifold base and the change-over valve are joined together.

In accordance with the invention, the above-mentioned ridges on the gasket are arranged in a width substantially same as or smaller than that of the grooves, and in a height substantially same as or greater than the depth of the grooves on the opposing joining surface.

In contrast to a seal employing a gasket of a simple flat shape, the above-described seal construction according to the invention precludes deviations and deformations of the gasket by the engagement of the ridges and grooves even if a greater force is imposed partially in certain localities of the gasket. Accordingly, the seal construction of the invention can maintain a constant seal position to produce stabilized sealing effects, holding the gasket stably in its mounted position by the engagement of the ridges and grooves, keeping the gasket from positional deviations which might otherwise be caused by the action of air pressures or other external forces acting on the gasket from a lateral direction.

Besides, the gasket can produce substantially tripled sealing effects by its sealing actions at the centrally located ridges as well as at the flat sealing surfaces on the opposite sides of the ridges, so that it contributes to improve the seal strength drastically as compared with gaskets in the form of simple flat sheets.

The above and other objects, features and advantages of the invention will become apparent from the following particular description of the invention, taken in conjunction with the accompanying drawings which show by way of example preferred embodiments of the invention.

DESCRIPTION OF PREFERRED EMBODIMENTS

Figure 1:
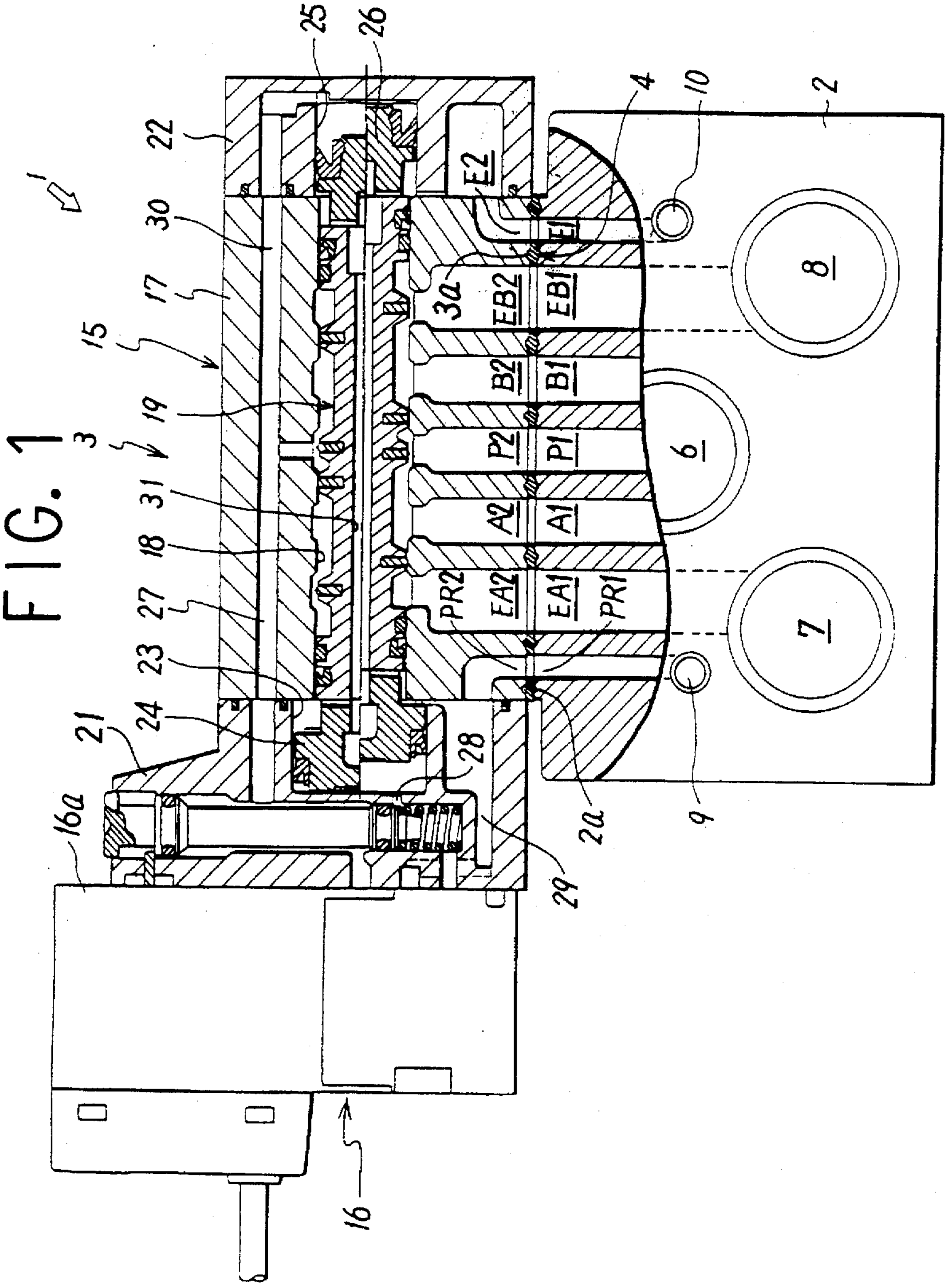
FIG. 1 is a partly cutaway schematic side view of a change-over valve assembly incorporating a seal construction according to the present invention.

Shown in FIG. 1 is a valve assembly 1 incorporating a seal construction according to the invention. The valve assembly 1 is largely constituted by a manifold base 2 containing a plural number of fluid supply and discharge passages, a change-over valve 3 integrally assembled with the manifold base 2 at its joining face 3a on the lower side of its casing, and a gasket 4 forming a seal between the base 2 and the change-over valve 3. In many cases, a plural number of similar change-over valve assemblies 1 with the manifold bases 2 are installed side by side, and the manifold bases of the respective change-over valves are connected successively one after another to operate the change-over valves collectively as a group.

The above-mentioned manifold base 2 contains a compressed air supply passage 6, a couple of air discharge passages 7 and 8, a pilot discharge passage 9, and a respiratory passage 10, along with a couple of output ports which are not shown in the drawings. The passages 6 to 10 are formed transversely through the manifold base 2 and connected to corresponding passages in adjacent manifold bases in a case where a plural number of manifold bases are connected in a lateral direction as mentioned above. The two output ports are opened separately on the front side of the base 2.

Opened in a substantially flat valve joining face 2a on the top side of the base 2 are a number of connecting ports, including an air supply port P1 in communication with the above-mentioned air supply passage 6, a couple of output ports A1 and B1 in communication with the above-mentioned output ports on the front side of the base 2, respectively, a couple of air discharge ports EA1 and EB1 in communication with the air discharge passages 7 and 8, respectively, a pilot discharge port PR1 in communication with the pilot discharge passage 9, and a respiratory port E1 in communication with the respiratory passage 10.

The above-mentioned change-over valve 3 is in the form of a pilot type electromagnetic change-over valve including a main valve section 16 and a pilot valve section 16.

The main valve section 15 includes a valve casing 17 which is provided with a substantially flat joining face 3a to be mounted on the valve joining face 2a of the base 2. Opened in the joining face 3a of the valve casing 17 are a corresponding number of connecting ports, including an air supply port P2, a couple of output ports A2 and B2, a couple of air discharge ports EA2 and EB2, a pilot discharge port PR2, and a respiratory port E2, which are respectively communicated with corresponding connecting ports in the valve joining face 2a on the manifold base 2. In communication with each one of these ports, the valve casing 17 is further provided with a valve bore 18 which slidably receives therein a spool valve body 19 thereby to switch compressed air flows between the air supply port P2 and the output ports A2 and B2 and between the output ports A2 and B2 and the air discharge ports EA2 and EB2.

The valve casing 17 has piston boxes 21 and 22 attached to axially opposite ends thereof, slidably receiving a large diameter piston 24 in a large diameter piston chamber 23 formed within the piston box 21 and a small diameter piston 26 in a small diameter piston chamber 25 formed within the other piston box 22. These pistons 24 and 26 are put in sliding movements by supply of pilot air pressures to and from the pilot valve section 16 to drive the above-described valve body 19.

The pilot valve section 16 is mounted on one piston box 21, and provided with a pilot supply port, a pilot output port and a pilot discharge port (all omitted in the drawings) to form a known 3-port valve, connecting the pilot output port with either the pilot supply port or the pilot exhaust port upon energization or de-energization of a solenoid 16a.

The pilot supply port is communicated with the air supply port P2 of the main valve section 15 through a pilot supply passage 27, the pilot output port is communicated with the piston chamber 23 through a pilot output passage 28, and the pilot discharge port is communicated with the pilot discharge port PR2 through a pilot discharge passage 29.

The piston chamber 25 is communicated with the air supply port P2 of the main valve section 15 through a passage 30, and respiratory chambers of the pistons 24 and 26 are communicated with each other through an axial intercommunicating passage 31 in the valve body 19 and at the same time with the respiratory port E2 of the main valve section 15.

In this connection, it is to be understood that the above-described change-over valve 3 is not restricted to a pilot type electromagnetic valve and can be arranged to drive the valve body by other drive means for switching communications between a plural number of ports.

Figure 4:
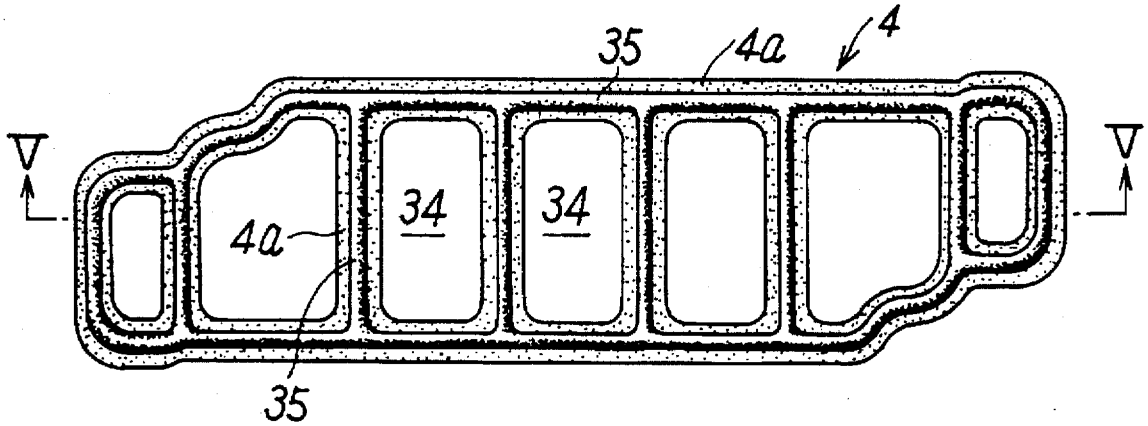
FIG. 4 is a schematic plan view of a gasket.
Figure 5:
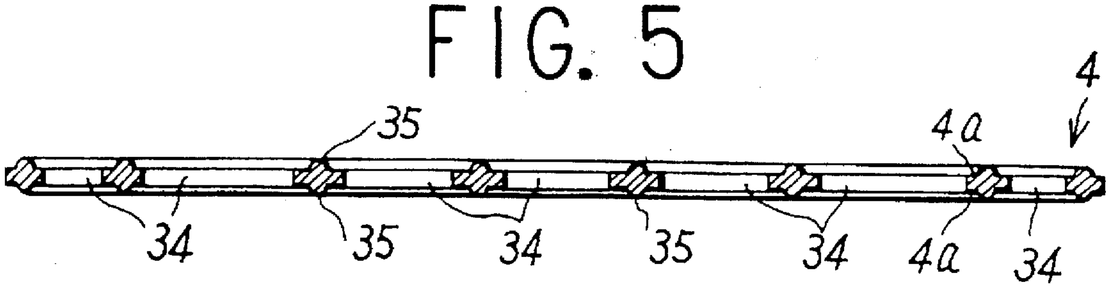
FIG. 5 is a schematic sectional view taken on line V—V of FIG. 4.

The gasket 4 which seals the joint of the manifold base 2 with the casing 17 of the change-over valve 3 is formed of a resilient material such as synthetic rubber or the like, and, as seen in FIGS. 4 and 5, provided with a plural number of openings 34 to communicate, in a circumferentially sealed state, the respective connecting ports in the joining face 2a of the manifold base 2 with the corresponding connecting ports in the joining face of the valve casing 17, more specifically, to communicate in a circumferentially sealed state the air supply port P1 with the corresponding port P2, the output ports A1 and B1 with the corresponding ports A2 and B2, the air discharge ports EA1 and EB1 with the corresponding ports EA2 and EB2, the pilot discharge port PR1 with the corresponding port PR2, and the respiratory port E1 with the corresponding port E2, respectively. The gasket 4 is formed with continuous ridges 35 on the front and rear sides thereof in such a manner as to circumvent each one of the above-described connecting ports in the joining faces 2a and 3a and to extend centrally of its substantially flat sealing surfaces 4a to be brought into abutting engagement with the joining faces 2a and 3a, respectively.

Figure 2:
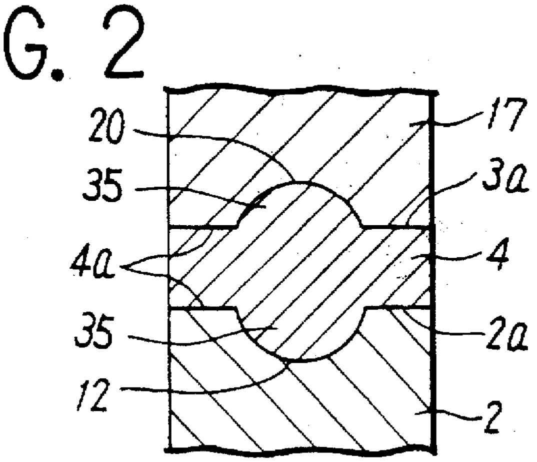
FIG. 2 is an enlarged fragmentary view of essential parts of the seal construction.
Figure 3:
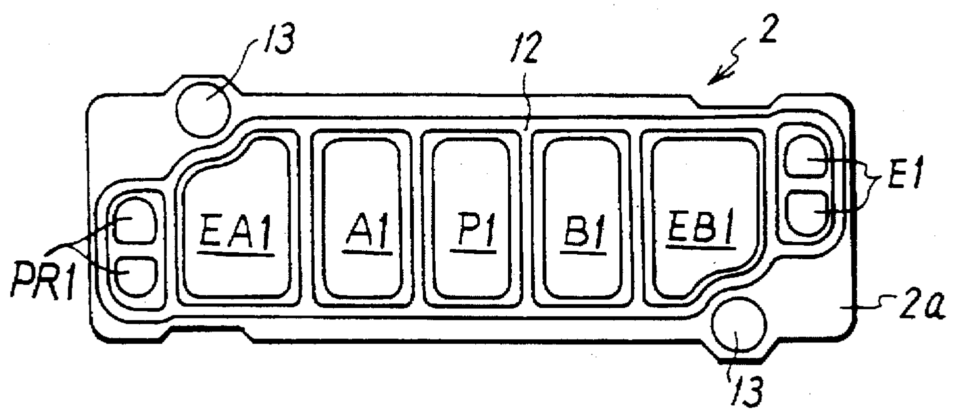
FIG. 3 is a schematic plan view of a manifold base of the valve assembly.

As seen in FIGS. 2 and 3, the joining faces 2a and 3a of the manifold base 2 and the casing 17 of the change-over valve 3 are provided with grooves 12 and 20 around the respective connecting ports to receive the ridges 35 on the upper and lower sides of the gasket 4. Accordingly, the sealing ridges 35 are fitted in and pressed against the grooves 12 and 20 when the gasket 4 is tightly gripped between the manifold base 2 and the change-over valve casing 17.

The reference numeral 13 in FIG. 3 denotes screw holes which receive screws to fasten the manifold base 2 and the change-over valve casing 17 securely to each other.

Figure 6A:
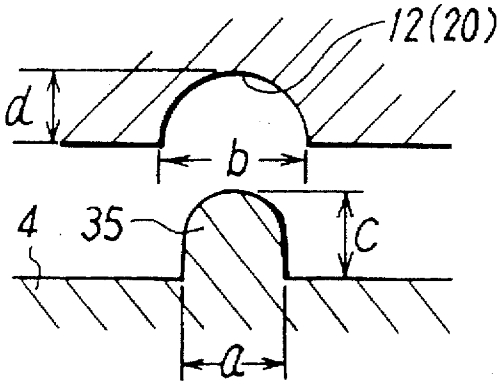
FIGS. 6(A) to 6(C) are fragmentary sectional views of sealing ridges and grooves of different profiles.

The above-described ridges 35 and grooves 12 and 20 are arranged in the dimensional relations as shown in FIG. 6. More specifically, as shown in FIG. 6(A), ridges 35 which have a width (a) substantially same as the width (b) of the grooves 12 (20) are arranged to have a height (c) which is likewise substantially same as the depth (d) of the latter. In case of ridges 35 which have a width (a) slightly smaller than the width (b) of the grooves 12 (20), they are preferably arranged to have a height (c) slightly greater than the depth (d) of the grooves 12 (20). When arranged in this manner, the gasket 4 can be compressed fluid-tight between the manifold base 2 and the change-over valve casing 17.

Figure 6B:
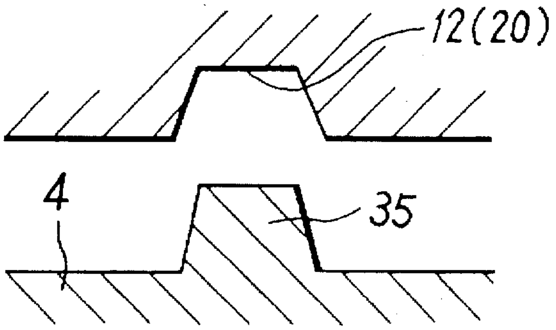
Figure 6C:
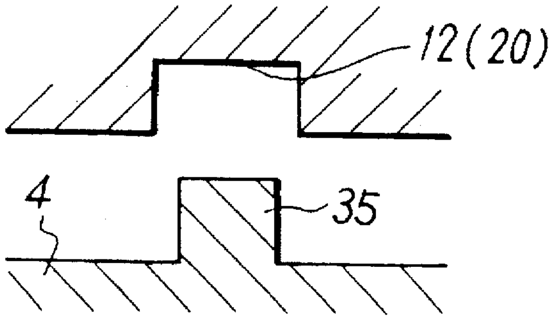

Further, the grooves 12 (20) and the ridges 35 may be formed in any arbitrary sectional shapes as long as they satisfy the above-mentioned dimensional conditions on their heights and widths. For instance, as shown in FIGS. 6(A) to 6(C), they may be of semi-circular, trapezoidal or rectangular shapes in section. Alternatively, the ridges on the opposite sides of the gasket 4 may be formed in different dimensions and/or shapes if desired. In such a case, needless to say, the grooves 12 and 20 on the joining faces of the base 2 and the valve casing 17 need to be dimensioned or shaped complementarily to the opposing ridges.

In the assembling process of the above-described valve assembly 1, the gasket 4 is placed on the joining surface 2*a* on the upper side of the base 2, bringing the ridges 35 on its lower sealing surfaces 4*a* into engagement with the grooves 12. Thereafter, the change-over valve 3 is placed on top of the gasket 4 with the grooves 20 on the joining surface 3*a* on the bottom side of its casing 17 in engagement with the ridges 35 on the upper sealing surfaces 4*a* of the gasket 4. The manifold base 2 and the change-over valve 3 are securely assembled together through the gasket 4 by tightening the afore-mentioned fastening screws which are not shown in the drawings.

At this time, the sealing ridges 35 on the opposite sides of the gasket 4 are held in engagement with the grooves 12 and 20 on the joining faces of the manifold base 2 and the change-over valve casing 17, so that, even if localized forces are applied thereto at the time of tightening the fastening screws, the gasket 4 is retained in position accurately under strong pressure, free of positional deviations or deformations which are usually experienced with conventional thin sheet-like gaskets. Accordingly, the gasket 4 can be maintained in a constant sealing position to produce stable sealing effects. Besides, by the engagement of the sealing ridges 35 with the grooves 12 and 20, the gasket 4 is retained in a constant position after assembling to preclude positional deviations which might otherwise be caused to the gasket 4 by the action of compressed air or other external forces.

The gasket 4 has sealing functions not only at the ridges 35 which are strongly pressed against the grooves 12 and 20 centrally of the sealing surfaces 4*a*, but also at the flat sealing surfaces 4*a* which are firmly gripped between the joining faces 2*a* and 3*a* on the opposite sides of the ridges 35, thereby producing substantially tripled sealing effects to ensure a drastically enhanced sealing strength as compared with conventional gaskets of simply flat shapes.

In the above-described particular embodiment, the gasket 4 is provided with sealing ridges 35 on both of its front and rear sides for engagement with the grooves 12 and 20 on the joining faces of the base 2 and the change-over valve casing. However, if desired, the ridges 35 may be provided only on one side of the gasket 4 for engagement with sealing grooves on the opposing joining face 2*a* or 3*a*.

Even in such a case, the sealing ridges and grooves are compressed to each other to a sufficient degree to prevent sealing failures which are attributable to positional deviations or deformations of the gasket.

The operation of the change-over valve 3 itself by energization and de-energization of the solenoid 16*a* is well known in the art, and therefore descriptions in this regard are omitted here.

What is claimed is:

1. A seal construction for a change-over valve assembly including a manifold base containing a plural number of fluid supply and discharge passages and joined with a change-over valve casing via a substantially flat gasket having joining faces interposed between joining faces of said manifold base and said valve casing, each of said faces connecting ports in communication with said fluid supply and discharge passages in said manifold base, wherein said seal construction includes:

endlessly connected ridges formed at least on one side of said gasket in such a manner as to circumscribe said connecting ports on said joining face of said manifold base or said change-over valve casing, said ridges extending substantially centrally of flat sealing surfaces of said gasket; and grooves formed on said opposing joining faces in a shape substantially complementary to said ridges to receive and grip said ridges. therein when said manifold base and change-over valve are joined together wherein said ridges have a width smaller than that of said grooves and a height larger than the depth of said grooves, and wherein each of said ridges has a width at a top thereof which is not greater than a width at a base thereof.

2. The seal construction of claim 1, wherein a cross-section of said groove is semi-circular and wherein a cross-section of the top of said ridge is semi-circular with a radius of curvature smaller than that of said groove.

* * * * *